US005622569A

United States Patent [19]

Dennis et al.

[11] Patent Number: 5,622,569

[45] Date of Patent: Apr. 22, 1997

[54] ALUMINUM RIGID CONTAINER SHEET CLEANER AND CLEANING METHOD

[75] Inventors: Alfred M. Dennis, Newburgh, Ind.; Joseph D. Guthrie, Murrysville; George T. Gregory, Lower Burrell, both of Pa.

[73] Assignee: Aluminum Company of America, Pittsburgh, Pa.

[21] Appl. No.: 459,926

[22] Filed: Jun. 2, 1995

[51] Int. Cl.$^6$ .............................. C23G 1/00; B08B 1/00; C09K 13/02

[52] U.S. Cl. .................................. 134/2; 134/14; 134/15; 134/40; 134/41; 134/42; 252/79.5; 510/254; 510/272; 510/433; 510/434; 510/435

[58] Field of Search .................................. 134/2, 14, 15, 134/19, 40, 42, 41; 252/156, 174.14, 174.16, 174.17, 174.21, 79.5; 510/254, 272, 433–435

[56] References Cited

U.S. PATENT DOCUMENTS

| | | | |
|---|---|---|---|
| 3,453,144 | 7/1969 | Morgan et al. | 134/26 |
| 3,655,467 | 4/1972 | Sopp, Jr. | 156/22 |
| 3,687,858 | 8/1972 | Geisler et al. | 252/156 |
| 3,900,370 | 8/1975 | Germscheid et al. | 204/38 |
| 3,962,060 | 6/1976 | Brasko et al. | 204/181 |
| 4,010,086 | 3/1977 | Barrett et al. | 204/141.5 |
| 4,126,483 | 11/1978 | Donakowski et al. | 134/3 |
| 4,320,023 | 3/1982 | White | 252/75 |
| 4,382,825 | 5/1983 | McCready | 134/2 |
| 4,485,027 | 11/1984 | Rossmann et al. | 252/90 |
| 4,528,039 | 7/1985 | Rubin et al. | 134/2 |
| 4,540,444 | 9/1985 | Kelly | 134/3 |
| 4,599,116 | 7/1986 | King et al. | 134/2 |
| 4,762,638 | 8/1988 | Dollman et al. | 252/135 |
| 4,778,533 | 10/1988 | Gregory et al. | 134/29 |
| 5,187,046 | 2/1993 | Patrick et al. | 430/278 |
| 5,296,042 | 3/1994 | Curran et al. | 134/2 X |
| 5,382,295 | 1/1995 | Aoki et al. | 134/2 |
| 5,407,702 | 4/1995 | Smith et al. | 427/211 |

*Primary Examiner*—Arlen Soderquist
*Attorney, Agent, or Firm*—Gary P. Topolosky

[57] ABSTRACT

A method for cleaning and modifying the surface of aluminum container sheet to make improved food can bodies and/or beverage can ends therefrom. The lowering of magnesium levels on an aluminum oxide surface and through the oxide-metal interface of this sheet, and deposition of at least some phosphorus-containing complex thereon produces container sheet that exhibits improved corrosion performance. The method comprises contacting said container sheet for less than about 20 seconds with a cleaner which preferably includes: about 1.0–10.0 wt. % (10.0–100.0 g/L) of sodium carbonate; about 0.1–2.5 wt. % (1.0–25.0 g/L) of sodium hydroxide, said cleaner including a total carbonate and hydroxide concentration in excess of about 3.0 wt. % (30.0 g/L); about 0.1–2.5 wt. % (1.0–25.0 g/L) of sodium gluconate; about 0.1–2.0 wt. % (1.0–20.0 g/L) of a compound containing 1-hydroxyethylidene-1,1-diphosphonic acid (or "HEDP"); and about 0.05–1.0 wt. % (0.5–10.0 g/L) of an alkylphenoxypolyethoxyethanol-based surfactant, the balance water and incidental impurities.

11 Claims, 4 Drawing Sheets

ALUMINUM RIGID CONTAINER SHEET CLEANER AND CLEANING METHOD

BACKGROUND OF THE INVENTION

1. Field of the Invention

This invention relates to aluminum rigid container sheet and an improved method for cleaning the same. The invention further relates to an improved cleaner composition for beverage can sheet, particularly can end sheet made from 5000 Series aluminum alloys (Aluminum Association designation). In addition, this invention addresses the specific need to lower the magnesium concentration on the aluminum oxide surface and throughout the oxide-aluminum metal interface of such rolled sheet product, preferably by modifying said surface and interface and depositing a corrosion inhibitor thereon.

2. Technology Review

Brasko et al. U.S. Pat. No. 3,962,060, the disclosure of which is fully incorporated herein by reference, discloses a continuous system for electrodepositing a coating material on metal sheet. That system includes: uncoiling and cleaning said sheet; passing it in a substantially straight line through respective coating, baking and cooling stations; supporting the sheet in a substantially straight position while directing liquid coating materials against opposite surfaces of said sheet; and electrically contacting this sheet with at least one charged electrode to promote the deposition of coating material on said sheet product. The present invention improves the cleaning steps of the foregoing electrocoat/electrodeposition system though it is to be understood that it may also be used in conjunction with other aluminum treatment processes, including the extrusion coating process set forth in U.S. Pat. No. 5,407,702, the disclosure of which is also fully incorporated by reference herein.

Numerous means are known for "cleaning" the surfaces of aluminum materials, especially those used for making food and/or beverage container products. Representative aluminum cleaning processes and/or compositions have been described in U.S. Pat. Nos. 3,687,858, 4,126,483, 4,528,039, 4,540,444 and 4,762,638. Alkaline-based cleaners for steel sheet products are taught in U.S. Pat. Nos. 4,010,086 and 4,382,825.

Gregory et al U.S. Pat. No. 4,778,533 focuses on a method for chemically treating aluminum-magnesium alloy sheet product to substantially inhibit magnesium oxide-containing films from forming thereon. The method comprises chemically treating such sheet, without prior degreasing or etching, with a polycarboxylic acid-free, alkaline-based cleaner to which is added more than about 0.2 wt. % of a compound containing hydroxyethylidene-1,1-diphosphonic acid, or HEDP.

For purposes of preventing de-smutting and blackening of a 3000 Series aluminum can body stock which contains very little magnesium, Aoki et al. U.S. Pat. No. 5,382,295 uses a four-part cleaner consisting of: from 0.5 to 10.0 g/L of an alkali builder component; from 0.5 to 10.0 g/L of an aminoalkylphosphonic acid, hydroxyalkylphosphonic acid, or water soluble salt thereof; from 0.1 to 3.0 g/L of an aluminum ion sequestering agent; and from 0.5 to 5.0 g/L of a surfactant component, as part of a 10–12 pH, aluminum cleaner used to contact said stock for 20–60 seconds, or more typically for 30–50 seconds, before a lacquer is applied directly thereto.

SUMMARY OF THE INVENTION

It is a principal objective of this invention to provide aluminum container sheet with decreased relative atomic concentrations of magnesium on the aluminum oxide surface and throughout the oxide-aluminum metal interface of said sheet. Another objective is to provide such sheet with lower aluminum migration or "pickup" when beverage can ends made from such sheet are subjected to long-term storage conditions. Still another objective is to provide such aluminum container sheet with better corrosion resistance through surface modification by depositing some phosphorus-containing corrosion inhibitor on the cleaned outer surface of said sheet.

It is another principal objective of this invention to simplify the manufacture of coils of 5000 Series aluminum from which food can bodies and/or beverage can ends are made. Most notably, through use of the cleaner described below, it is possible to avoid the conversion-coating steps typically associated with rigid container sheet manufacture. For preferred embodiments, even extrusion coating processes may be performed directly on such cleaned sheet without first having to apply a chromium, titanium and/or zirconium based pretreatment thereon.

Still another main objective of this invention is to provide a suitable, more environmentally acceptable alternative to some of the prior art aluminum sheet cleaners described above. Another principal objective is to provide a cleaner formulation which accomplishes the foregoing goals and expectations on feedstock passing through costly cleaning, pretreating and coating equipment at very fast speeds. Prior art cleaners which desmut formed cans and can body stock made from 3000 Series aluminum alloys when contacted for greater than 20 seconds are just too slow for today's high production line speeds, let alone the faster line speeds of tomorrow.

These and other advantages/objectives of the present invention are accomplished by the improved method described herein for cleaning, and surface modifying in a single step, aluminum container sheet for use in making food cans and beverage can ends therefrom. This method comprises contacting aluminum container sheet for less than 20 seconds with a cleaner which includes: about 1.0–10.0 wt. % (10.0–100.0 g/L) of an alkali metal carbonate; about 0.1–2.5 wt. % (1.0–25.0 g/L) of an alkali metal hydroxide, said cleaner including a total concentration of alkali metal carbonate and alkali metal hydroxide in excess of about 3.0 wt. % (30.0 g/L); about 0.1–2.5 wt. % (1.0–25.0 g/L) of an alkali metal gluconate; about 0.1–2.0 wt. % (1.0–20.0 g/L) of a compound containing 1-hydroxyethylidene-1,1-diphosphonic acid (or "HEDP"); and about 0.05–1.0 wt. % (0.5–10.0 g/L) of an alkylphenoxypolyethoxyethanol-based surfactant, the balance water and incidental impurities. The present invention also addresses the cleaner itself and the can end sheet made with this cleaning treatment.

BRIEF DESCRIPTION OF THE DRAWINGS

Further features, objectives and advantages of the present invention are clarified and elaborated upon in the following detailed description of preferred embodiments made with reference to the accompanying drawings in which.

DETAILED DESCRIPTION OF PREFERRED EMBODIMENTS

Figure 1A:
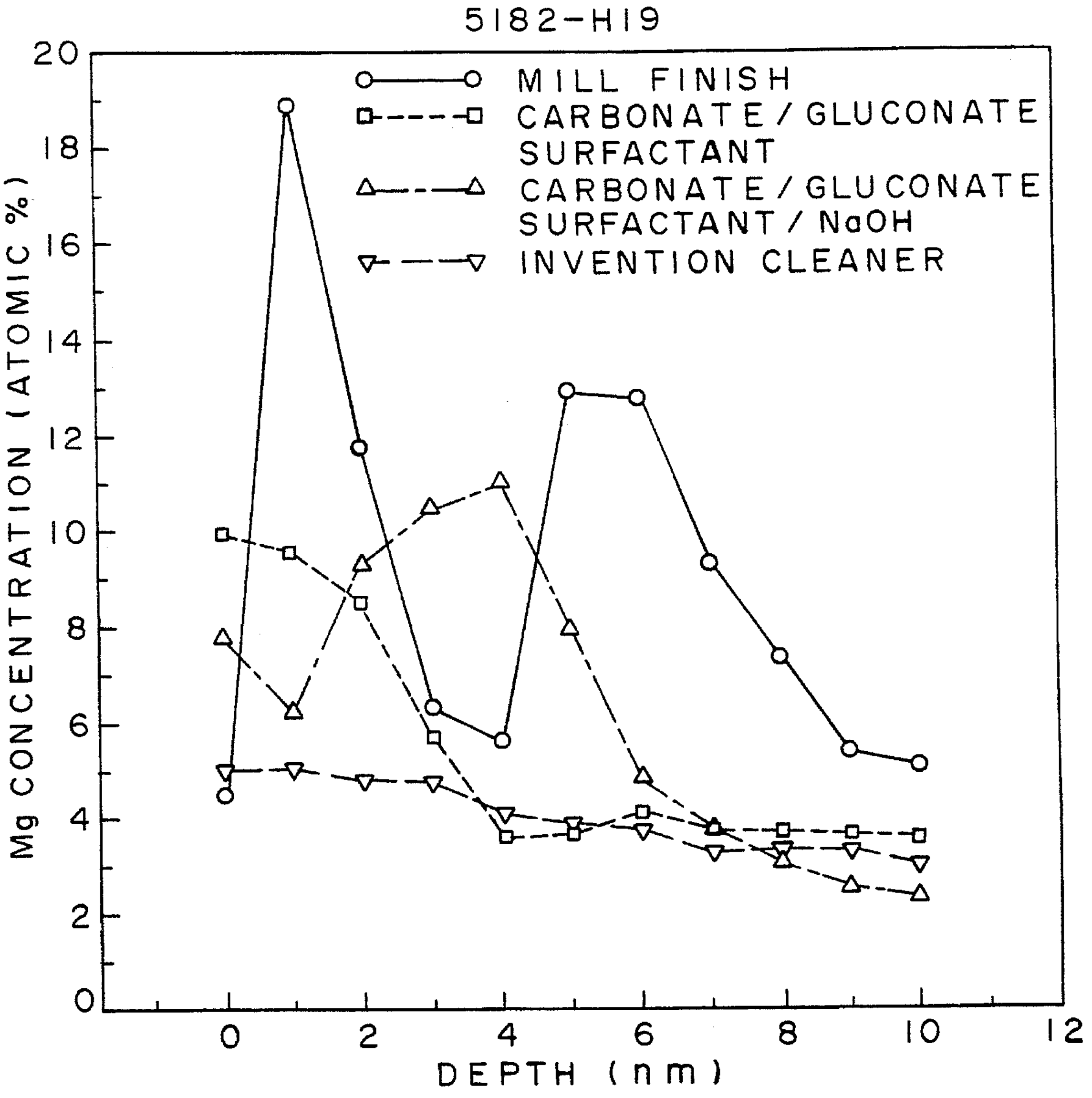
FIG. 1*a* is a graph comparing the various relative surface concentrations of magnesium on the aluminum oxide surface of this 5182-H19 tempered aluminum sheet product and through the first 10 nanometers (nm) of the oxide-aluminum metal interface of said sheet product in four states as Mill-finished, then as treated with: a prior art cleaner, the latter cleaner to which was added sodium hydroxide; and the invention cleaner, each of said atomic surface scans being performed on a Model DS800 XPS Surface Analysis Ion Scattering Spectroscopy System sold by Kratos Analytical pLc of Manchester, United Kingdom.

In the description of preferred cleaner components that follows, all percentage references are to relative weight percents (wt. %) unless otherwise indicated with grams per liter (g/L) equivalents listed parenthetically thereafter in many instances. When referring to any numerical range of values, such ranges are understood to include each and every number and/or fraction between the stated range minimum and maximum. A compositional range of about 0.1–2.5 wt. % sodium gluconate, for example, would expressly include all intermediate values of about 0.11, 0.12, 0.13 and 0.15 wt. %, all the way up to and including 2.45, 2.47 and 2.49 wt. % gluconate. The same applies to each other elemental range set forth herein.

As used herein, the term "conversion coating" means the application of a pretreatment to aluminum alloys to inhibit corrosion and promote the adhesion of organic coatings thereto. Representative pretreatments or "conversion coatings" include: growing an aluminum oxide film on a given aluminum sheet product; depositing a chromium phosphate or chromium chromate film thereon; or treating said sheet product to form a thin layer of fluoride and/or phosphate complexes of titanium, zirconium and/or molybdenum thereon.

The term "beverage" herein is meant to include but not be limited to: beer, soft drinks or soda pops, both regular and diet varieties thereof, and sports drinks. The term "aluminum migration", or sometimes called "aluminum pickup", is a phenomenon associated with the solubilization of aluminum from the beverage container, through an intermediate lacquer or other protective coating liner and into the beverage contained therein. It is an accepted industry standard for measuring corrosion in aluminum beverage cans.

Each of the various components to this five-part cleaner are important for accomplishing the whole surface-modifying, conversion-coat eliminating nature of this invention. As for preferred constituent levels, the alkali metal carbonate content should be maintained between about 1.0–10.0 wt. % (or about 10.0–100.0 g/L). On a more preferred basis, sodium carbonate levels for this cleaner run between about 3.0–6.0 wt. % (or about 30.0–60.0 g/L), with a typical $Na_2CO_3$ content between about 3.5–5.0 wt. % (or about 35.0–50.0 g/L) being most preferred. And while sodium carbonate is the preferred carbonate component of choice, it is to be understood that other carbonate-based additives, such as potassium carbonate, may be fully or partially substituted therefor.

For the necessary hydroxide additive of this cleaner, about 0.1–2.5 wt. % (or about 1.0–25.0 g/L) of sodium hydroxide is preferred, though it is to be understood that any other alkali metal hydroxide, such as KOH, may be fully or partially substituted therefor. On a preferred basis, about 0.025–0.9 wt. % (or about 0.25–9.0 g/L) of NaOH is added to this cleaner to effect the precise etching results described below, with most preferred hydroxide levels running about 0.05–0.4 wt. % (or about 0.5–4.0 g/L). Still other additions of sodium hydroxide may be required, however, to convert the acid form of HEDP additive into a more useable component by this cleaner. For instance, on a molar ratio basis, about 4 moles of NaOH are required for each mole of HEDP acid used to obtain the salt form $Na_4$ HEDP. Thus, about 0.08–1.6 wt. % (or about 0.8–16 g/L) NaOH is required when the acid form of HEDP is added to the other cleaner components of this invention. In any event, the total combined concentration of both alkali metal carbonate and alkali metal hydroxide elements of this cleaner should exceed about 3.0 wt. % (or about 30.0 g/L), or more preferably range between about 3.5–6.0 wt. % (or about 35.0–60.0 g/L). These additives, both the carbonate and hydroxide, serve the primary purpose of elevating and maintaining the cleaner's pH to generate a desired etch rate.

The alkali metal gluconate levels of this cleaner composition may vary between about 0.1–2.5 wt. % (or about 1.0–25.0 g/L). On a preferred basis, this cleaner contains about 0.3–1.0 wt. % (or about 3.0–10.0 g/L) of sodium gluconate with a more typical $NaC_6H_{11}O_7$ content running between about 0.4–0.7 wt. % (or about 4.0–7.0 g/L). And while sodium gluconate is the preferred additive of choice, it is to be understood that other gluconate-based additives, such as potassium gluconate or sodium glucoheptanate for that matter, may be fully or partially substituted therefor and the relative concentrations of each such component correspondingly adjusted therefor.

For the compound containing 1-hydroxyethylidene-1,1-diphosphonic acid (HEDP), about 0.1–2.0 wt. % (or about 1.0–20.0 g/L) of HEDP itself, or its salt form, e.g., [$Na_4$HEDP], is most appropriate though on a more preferred basis, about 0.15–1.0 wt. % (or about 1.5–10.0 g/L) should be added to the other cleaner constituents described herein. A typical HEDP cleaner content runs between about 0.15–0.35 wt. %. (or about 1.5–3.5 g/L) with a total HEDP content of about 0.23 wt. % (or about 2.3 g/L) being most preferred. One commercial form of this additive is sold by Monsanto Corporation under the trade name Dequest®. Dequest® 2010 is the preferred acid form of this additive, and it is also available for purchase in salt form under the product name Dequest® 2016. It is to be understood that other comparable HEDP cleaner additives from Monsanto's competitors, like Mayo Chemical Co., Lonza Inc., Henkel Corp. and Buckman Laboratories, Inc., may be fully or partially substituted for this particular cleaner component.

The preferred surfactant of this invention is an alkylphenoxypolyethoxyethanol-based surfactant which is added in amounts ranging from about 0.05 to 1.0 wt. % (or about 0.5–10.0 g/L), said surfactant being used primarily to wet the aluminum surface, and solubilize any oils, greases, lubricants or other organic rolling residues remaining on the sheet surface to be treated. A more preferred embodiment includes about 0.15–0.5 wt. % (or about 1.5–5.0 g/L) of an octylphenoxypolyethoxyethanol sold commercially by Union Carbide Corporation under the name Triton®, though it is to be understood that other ethanol-based, or ethoxylated octylphenols may be fully or partially substituted therefor. Excellent results have actually been reported using a blend of both Triton® X-45 and Triton® X-102.

In the preferred practices of this invention, the foregoing composition is heated to one or more temperatures between about 120°–145° F. (49°–63° C.) before being brought in contact with the aluminum container sheet for less than about 20 seconds, typically less than about 10 seconds, and usually for about 2–6 seconds depending on total line speeds. The most typical means of cleaner contact is by continuous or substantially continuous spray applications, though it is be understood that immersion and other known or subsequently developed cleaning practices may also be employed using the aforementioned cleaner composition. Applications of this cleaner are then immediately followed by a heated rinse and drying stage before an organic coating layer is applied directly onto the cleaned, rinsed and dried sheet surface, typically by electrodeposition though alternate embodiments include extruding of coating layers thereon. Overall, this procedure is intended to replace the 4 or 5 stage cleaning practices of the prior art wherein uncoiled can end sheet is; (i) cleaned; (ii) rinsed; (iii) conversion coated; (iv) optionally re-rinsed and dried before being (v) organically coated and recoiled for shipment to an end user/customer.

Most rigid container can end products are made of a 5000 Series aluminum alloy, like 5182 aluminum (Aluminum Association designation). They are typically prepared for the application of an organic coating thereon by first applying a conversion coating or pretreatment of chromium phosphate, or titanium or zirconium phosphate and/or fluoride thereon. While such conversion coatings are believed to promote adhesion and enhance corrosion resistance of the aluminum substrate therebeneath, the present invention achieves the same results from cleaned only can sheet without having to incur the extra equipment and materials' costs associated with performing an intermediate conversion coating step thereon. In fact, when rigid container sheet is cleaned with, and its oxide-metal interface modified by, the aforementioned cleaner composition, corrosion resistance and coating adhesion properties are so enhanced as to make the application of any intermediate conversion coating unnecessary.

Figure 1B:
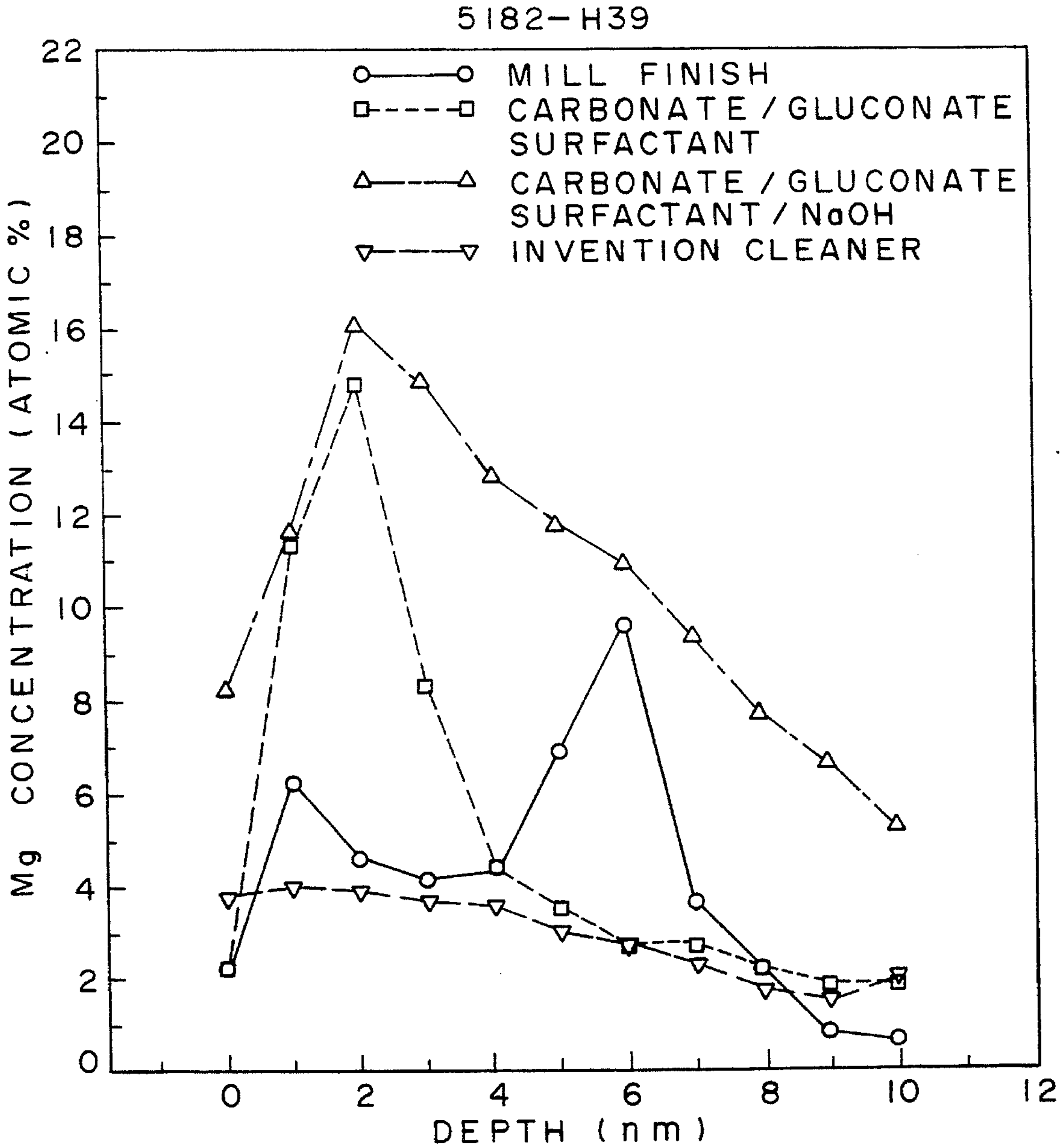
FIG. 1*b* is a graph similar to that shown in FIG. 1*a* except that it compares the same relative surface concentrations of magnesium for 5182 can sheet heat treated to an H39 temper.
Figure 2A:
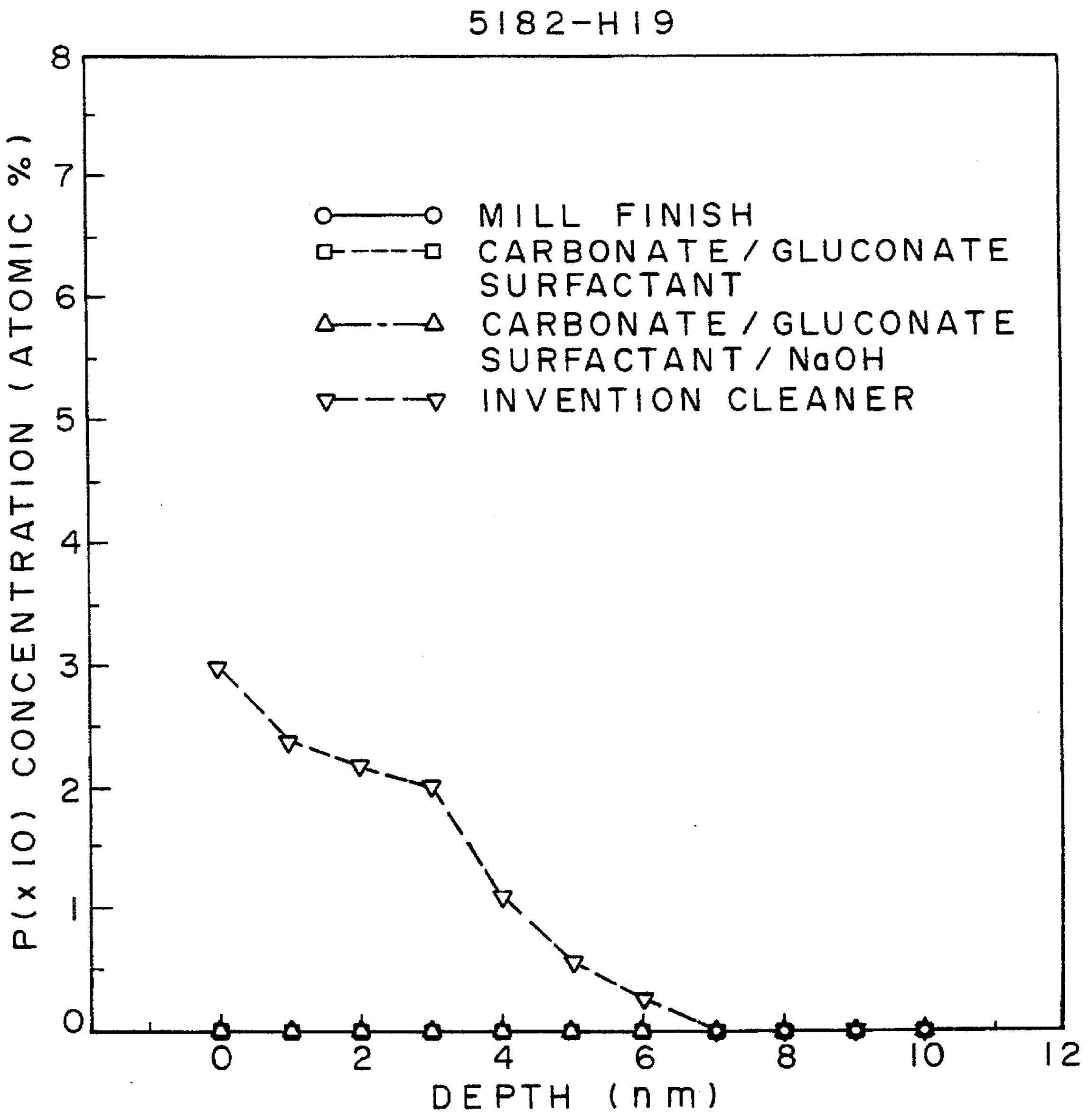
FIG. 2*a* is a graph comparing the various relative surface concentrations of phosphorus (magnified tenfold) in the first 10 nm of 5182 aluminum can sheet which was H19 tempered (as Mill-finished), then as treated with: a prior art cleaner, the latter cleaner to which was added sodium hydroxide; and the invention cleaner, each of said atomic surface scans being performed on the same Ion Scattering Spectroscopy machine as identified above.
Figure 2B:
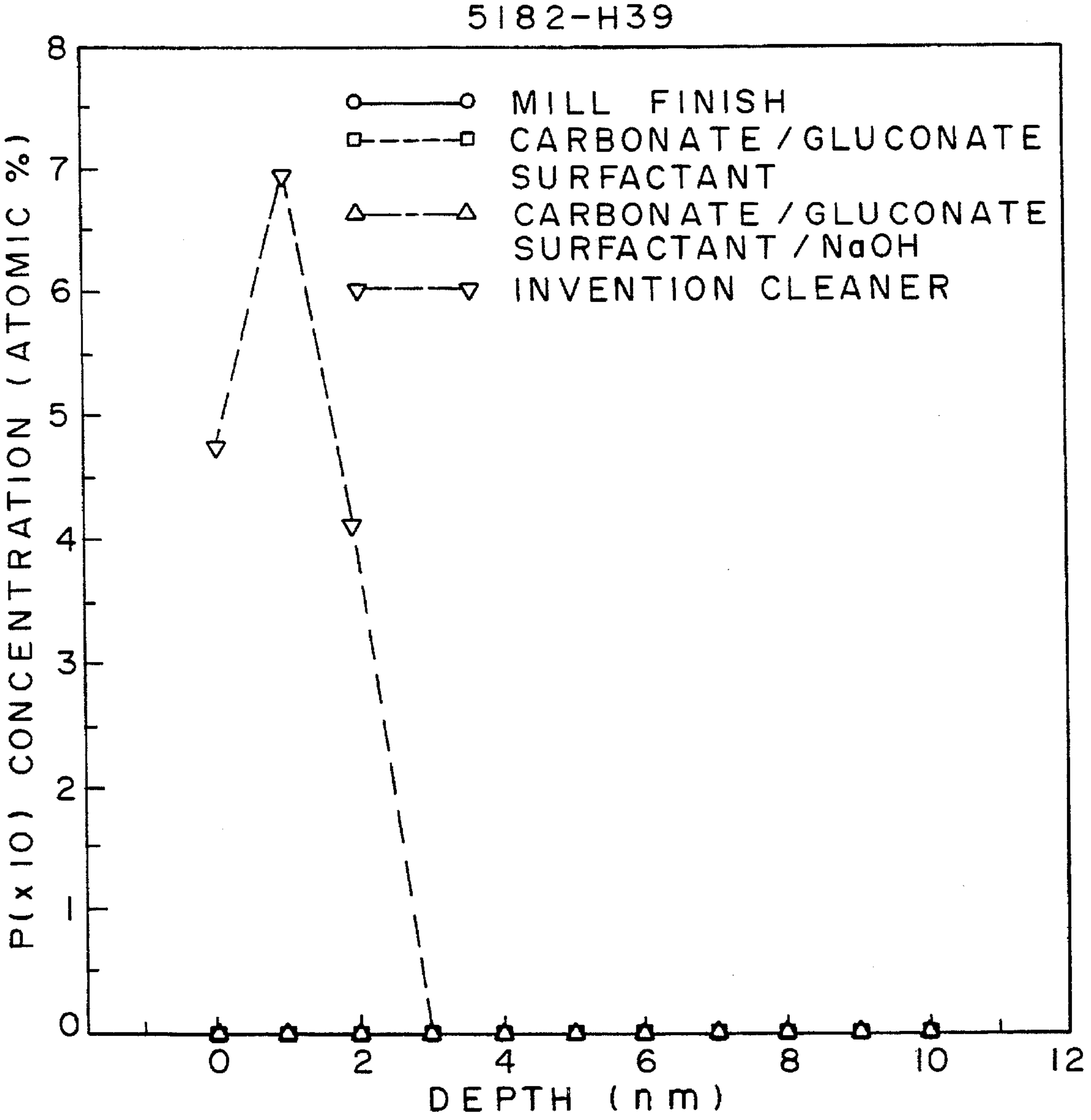
FIG. 2*b* is a graph similar to that shown in FIG. 2*a* except that it compares the same relative surface concentrations of phosphorus for 5182 can sheet heat treated to an H39 temper.

It is believed that the invention achieves these property enhancements by directly affecting the surface chemistry of the surface portion of the aluminum sheet with which the cleaner has made contact. Using Ion Scattering Spectroscopy-type surface analysis, a reduction in magnesium in and through the outer layer of each treated metal surface, and more particularly in and through the aluminum oxide-aluminum metal interface of said sheet, was observed for 5182 H19 tempered sheet (per FIG. 1*a*) and for its H39 tempered equivalents (FIG. 1*b*). For each of these comparisons, specimens of 5182 sheet were exposed to a 4 keV primary ion source of $^3$He at a scattering angle of 125° in the aforementioned Kratos Analytical ion spectroscopy system, with a fifteen minute etching step being performed between each spectra analysis at an etching rate of about 0.5 Å/min. The tested aluminum sheet was treated in four cleaning states: (i) mill finished; (ii) as treated with a prior art cleaner consisting of only carbonate, gluconate and a surfactant; (iii) as treated with the same cleaner from above state (ii) to which was added some sodium hydroxide; and (iv) the invention cleaner. The first ten (10) nanometers (or "nm") of each sheet were analyzed in this manner to measure the amount of relative atomic weight magnesium remaining in said surface layers for FIG. 1 purposes, and the amount of relative atomic weight phosphorus left in said surface layers for purposes of FIG. 2. Note that for all but the Invention Cleaner, no phosphorus or phosphorus-containing residues were detected on the aluminum oxide surfaces or through the oxide-metal interfaces of these Mill-finished and other prior art cleaned sheet products. It is believed that these latter deposits of phosphorus, of at least about 0.3 atomic weight percent and more preferably about 0.6 atomic weight percent or more, come from the uneven layer of HEDP residues left on the sheet from the invention cleaner. Because of such reduced Mg contents and P depositions, however, there is an observed improvement in corrosion resistance as measured by reduced aluminum migration values when beverage can ends cleaned according to this invention have been assembled into cans, filled with carbonated beverages and exposed to long term pack tests. A relative comparison of aluminum migration data from pack tests performed on cleaned-only, electrocoated 5182 can ends shows the enhanced performance of this invention compared to its predecessor cleaner to which no NaOH or HEDP has been added. Table 1 quantitatively illlustrates this improvement.

TABLE 1

| Aluminum Migration Data | |
|---|---|
| Sample | Amt of Al (ppm) |
| Prior Art Cleaner | 0.49 |
| Invention Cleaner | 0.11 |

Having described the presently preferred embodiments, it is to be understood that the invention may be otherwise embodied by the scope of the claims appended hereto.

What is claimed is:

1. An improved method for cleaning food or beverage container sheet made from a 5000 Series (Aluminum Association designation) aluminum alloy and making said sheet more corrosion resistant, said method comprising contacting said sheet for less than about 20 seconds with a cleaner which includes: about 1.0–10.0 wt. % (10.0–100.0 g/L) of an alkali metal carbonate; about 0.1–2.5 wt. % (1.0–25.0 g/L) of an alkali metal hydroxide, said cleaner including a total concentration of alkali metal carbonate and alkali metal hydroxide in excess of about 3.0 wt. % (30.0 g/L); about 0.1–2.5 wt. % (1.0–25.0 g/L) of an alkali metal gluconate; about 0.1–2.0 wt. % (1.0–20.0 g/L) of a compound containing 1-hydroxyethylidene-1,1-diphosphonic acid (or "HEDP"); and about 0.05–1.0 wt. % (0.5–10.0 g/L) of an alkylphenoxypolyethoxy-ethanol-based surfactant, the balance water and incidental impurities.

2. The method as set forth in claim 1 wherein the alkali metal carbonate of said cleaner consists essentially of sodium carbonate, the alkali metal hydroxide consists essentially of sodium hydroxide and the alkali metal gluconate consists essentially of sodium gluconate.

3. The method as set forth in claim 2 wherein the cleaner contains about 3.0–6.0 wt. % (30.0–60.0 g/L) of sodium carbonate.

4. The method as set forth in claim 2 wherein the cleaner contains about 0.1–1.0 wt. % (1.0–10.0 g/L) of sodium hydroxide.

5. The method as set forth in claim 2 wherein the cleaner contains about 0.3–1.0 wt. % (3.0–10.0 g/L) of sodium gluconate.

6. The method as set forth in claim 2 wherein the cleaner contains about 0.15–1.0 wt. % (1.5–10.0 g/L) of the HEDP-containing compound.

7. The method as set forth in claim 1 wherein the surfactant is an octylphenoxypolyethoxyethanol.

8. The method as set forth in claim 7 wherein the cleaner contains about 0.15–0.5 wt. % (1.5–5.0 g/L) of the octylphenoxypolyethoxyethanol.

9. The method as set forth in claim 1 wherein the container sheet is contacted with cleaner for less than about 10 seconds and rinsed immediately thereafter.

10. The method as set forth in claim 1 wherein said cleaner is heated to one or more temperatures between about 120°–145° F. (49°–63° C.) before contact with said aluminum container sheet.

11. An improved cleaner for contacting with 5000 Series aluminum container sheet (Aluminum Association designations), said cleaner including: about 1.0–10.0 wt. % (10.0–100.0 g/L) of sodium carbonate; about 0.1–2.5 wt. % (1.0–25.0 g/L) of sodium hydroxide, said cleaner including a total carbonate and hydroxide concentration in excess of about 3.0 wt. % (30.0 g/L); about 0.1–2.5 wt. % (1.0–25.0 g/L) of sodium gluconate; about 0.1–2.0 wt. % (1.0–20.0 g/L) of a compound containing 1-hydroxyethylidene-1,1-diphosphonic acid (or "HEDP"); and about 0.05–1.0 wt. % (0.5–10.0 g/L) of an octylphenoxypolyethoxyethanol-based surfactant, the balance water and incidental impurities.

* * * * *